US010442515B1

(12) United States Patent
Wasil et al.

(10) Patent No.: US 10,442,515 B1
(45) Date of Patent: Oct. 15, 2019

(54) PROPULSION SYSTEM

(71) Applicant: BRP US INC., Sturtevant, WI (US)

(72) Inventors: Jeffrey Wasil, Kenosha, WI (US); George Broughton, Wadsworth, IL (US)

(73) Assignee: BRP US INC., Sturtevant, WI (US)

( * ) Notice: Subject to any disclaimer, the term of this patent is extended or adjusted under 35 U.S.C. 154(b) by 0 days.

(21) Appl. No.: 15/850,384

(22) Filed: Dec. 21, 2017

Related U.S. Application Data

(60) Provisional application No. 62/439,863, filed on Dec. 28, 2016.

(51) Int. Cl.
| | |
|---|---|
| *B63H 20/24* | (2006.01) |
| *B63H 20/32* | (2006.01) |
| *F02M 35/10* | (2006.01) |
| *F01N 3/023* | (2006.01) |
| *F01N 13/10* | (2010.01) |

(52) U.S. Cl.
CPC .......... *B63H 20/245* (2013.01); *B63H 20/32* (2013.01); *F01N 3/0233* (2013.01); *F02M 35/10229* (2013.01); *B63B 2758/00* (2013.01); *F01N 13/10* (2013.01); *F01N 2590/021* (2013.01)

(58) Field of Classification Search
CPC ..... B63H 20/245; B63H 20/32; F01N 3/0233; F01N 13/10; F01N 2590/021; F02M 35/10229; B63B 2758/00
See application file for complete search history.

(56) References Cited

U.S. PATENT DOCUMENTS

| | | | |
|---|---|---|---|
| 2,789,032 A | 4/1957 | Bagley et al. | |
| 3,045,423 A | 7/1962 | Hulsebus | |
| 3,699,683 A | 10/1972 | Tourtellotte et al. | |
| 4,507,092 A | 3/1985 | Hall et al. | |
| 4,985,210 A | 1/1991 | Minami | |
| 5,398,503 A | 3/1995 | Danno et al. | |
| 5,499,501 A | 3/1996 | Kato et al. | |
| 5,603,215 A | 2/1997 | Sung et al. | |
| 5,744,103 A | 4/1998 | Yamada et al. | |
| 6,122,908 A | 9/2000 | Wirmark | |
| 6,446,593 B1 * | 9/2002 | Suganuma | F02B 61/045 123/198 D |
| 8,635,852 B2 * | 1/2014 | Lupescu | F01N 3/031 60/274 |
| 2011/0308394 A1 | 12/2011 | Kim et al. | |

* cited by examiner

*Primary Examiner* — Anthony D Wiest
(74) *Attorney, Agent, or Firm* — BCF LLP

(57) ABSTRACT

A propulsion system has an internal combustion engine including an exhaust manifold and an engine air intake, an exhaust port fluidly connected to the exhaust manifold, a fresh air intake fluidly connected to the engine air intake and a filter assembly including adsorbent material and being configurable between a loading configuration allowing for filtration of at least some components of an exhaust gas of the engine, and a purging configuration allowing for removal therefrom of at least some of the components of the exhaust gas. In the loading configuration, the filter assembly is fluidly connected between the exhaust manifold and the exhaust port. In the purging configuration, the filter assembly is fluidly connected between the fresh air intake and the engine air intake. Above a threshold effective engine speed of the engine, the filter assembly is in the purging configuration. A method for treating exhaust gas is also described.

20 Claims, 10 Drawing Sheets

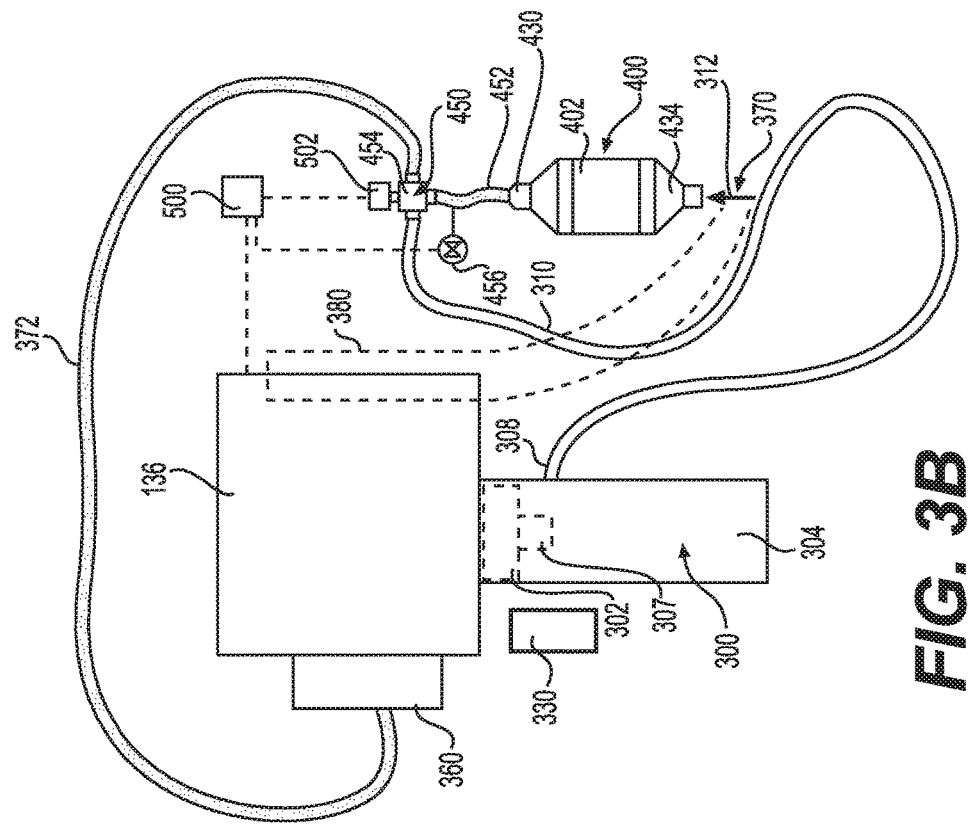
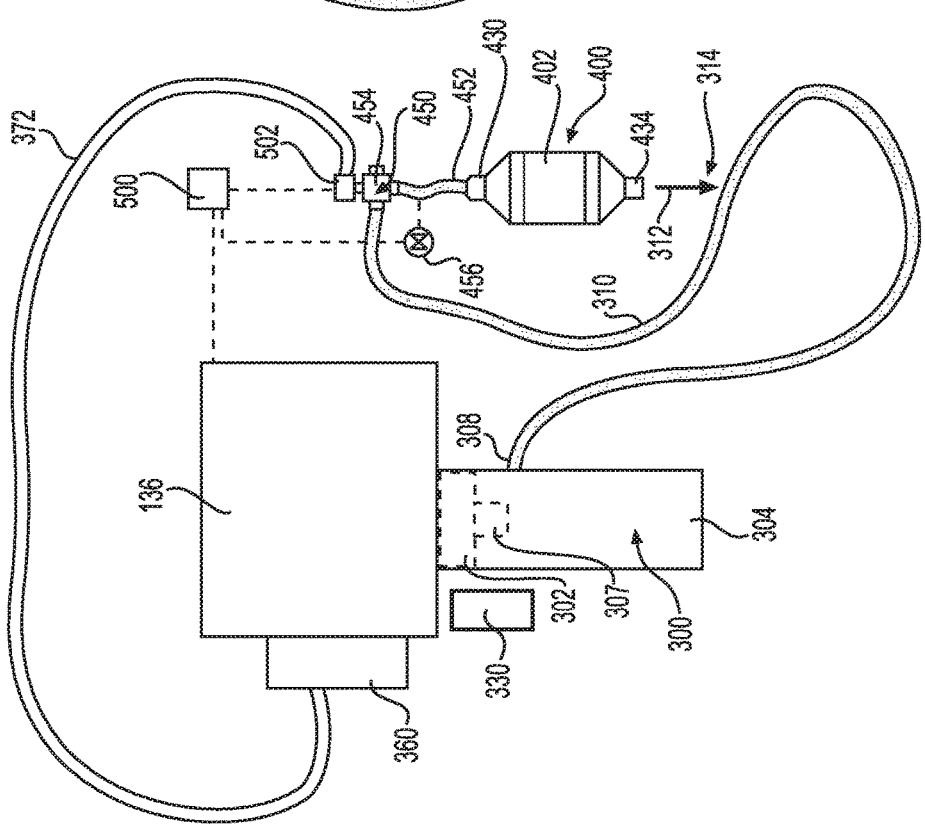

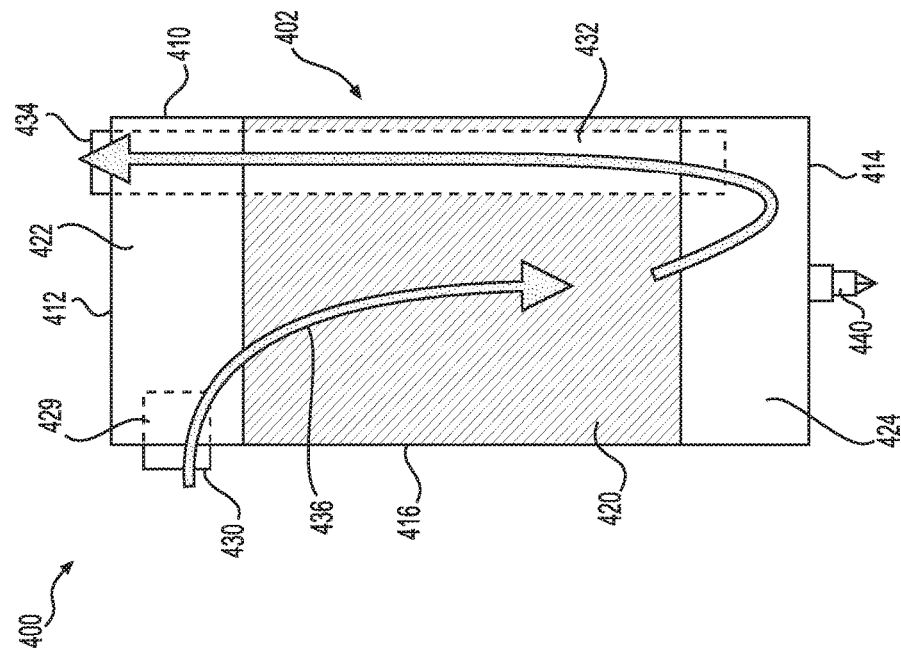
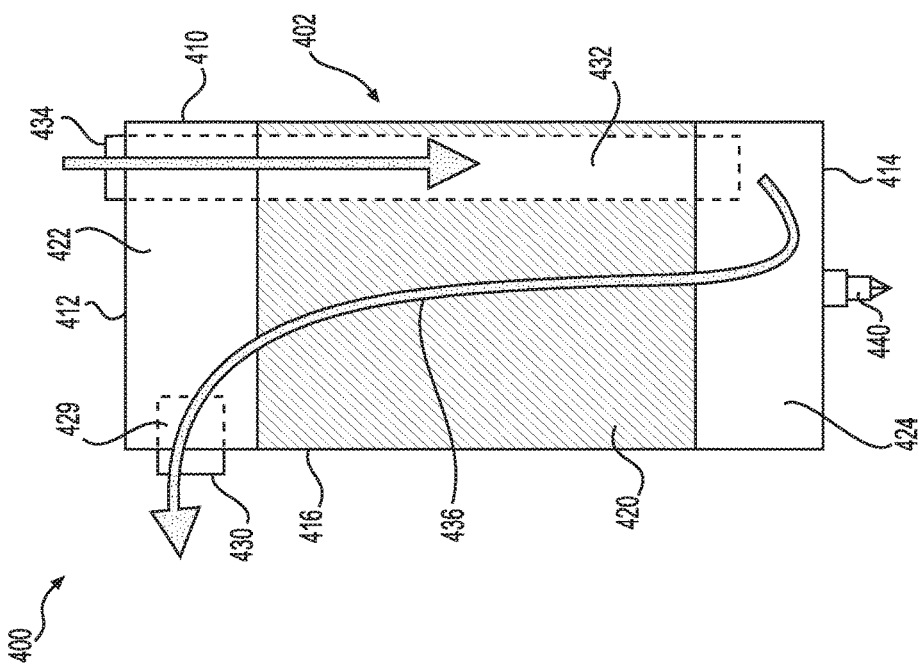
FIG. 4B
FIG. 4A

PROPULSION SYSTEM

CROSS-REFERENCE TO RELATED APPLICATION

The present application claims priority to U.S. Provisional Patent Application Ser. No. 62/439,863, filed Dec. 28, 2016, entitled "Propulsion System", which is incorporated by reference herein in its entirety.

FIELD OF TECHNOLOGY

The present technology relates to a propulsion system. More particularly, the present technology relates to a propulsion system having a filter assembly and to a method for treating exhaust gas.

BACKGROUND

Propulsion systems having an internal combustion engine powered by fossil fuel generate exhaust gas that comprises various components. The components of the exhaust gas generally include substances such as nitrogen, water vapor, carbon dioxide, hydrocarbons, nitrogen oxides, and particulate matter. Hydrocarbons result from the incomplete combustion of the fuel. Nitrogen oxides result from excessive combustion temperatures.

To reduce emission of undesirable substances in the atmosphere, various technologies are known. For instance, with respect to reducing emission of nitrogen oxides in the atmosphere, it is known to use activated carbon filters on stationary diesel engines used for power generation in a closed environment, such as in a mine. The exhaust gas of the stationary diesel engine is passed through an activated carbon filter and some components of the exhaust gas get loaded therein due to the adsorption properties of the activated carbon. When the activated carbon filters are saturated with nitrogen oxides, they are removed from the stationary diesel engines and replaced, or "purged" at a separate location by heating the activated carbon filter to remove the nitrogen oxides that were loaded therein. The handling required for the replacement or purge of the activated carbon filters may lead to high operating costs.

Other known technologies to reduce emission of undesirable substances in the atmosphere, such as exposing the exhaust gas to a catalytic converter, may not be suited for all types of propulsion systems powered by fossil fuel. For instance, as catalytic converters are most efficient at temperatures above 425° C., they may not be efficient for propulsion systems powered by fossil fuel having exhaust gas temperatures below 425° C. It is known to channel exhaust gas to an activated carbon filter after engine start and until the engine and exhaust reach a high enough temperature, after which the exhaust gas is channelled to a catalytic converter. In addition, the use of a catalytic converter may lead to an increase in costs of the propulsion system.

Therefore, there is a desire for a propulsion system that would reduce emission of undesirable components of the exhaust gas in the atmosphere while reducing the costs of the propulsion system and/or of its operation.

SUMMARY

It is an object of the present technology to ameliorate at least some of the inconveniences present in the prior art.

According to one aspect of the present technology, there is provided a propulsion system having an internal combustion engine including an exhaust manifold and an engine air intake, an exhaust port fluidly connected to the exhaust manifold, a fresh air intake fluidly connected to the engine air intake, and a filter assembly including an adsorbent material and being configurable between a loading configuration allowing for a filtration of at least some components of an exhaust gas of the internal combustion engine, and a purging configuration allowing for a removal of the at least some of the components of the exhaust gas from the filter assembly. In the loading configuration the filter assembly is fluidly connected between the exhaust manifold and the exhaust port. In the purging configuration the filter assembly is fluidly connected between the fresh air intake and the engine air intake. Above a threshold effective engine speed of the internal combustion engine, the filter assembly is in the purging configuration.

In some implementations, the filter assembly further includes a hollow body, first and second ports and a compartment formed within the hollow body and containing the adsorbent material, the compartment being fluidly connected between the first and second ports.

In some implementations, the hollow body includes top, bottom and lateral walls. The compartment extends vertically between the top and bottom walls. The filter assembly further includes a lower chamber defined in the hollow body and extending vertically between the compartment and the bottom wall, a filter conduit extending from the lower chamber, through the compartment and to the second port for fluidly connecting the lower chamber to an exterior of the hollow body, and a drain provided in the bottom wall for draining a liquid out of the hollow body.

In some implementations, the adsorbent material is activated carbon.

In some implementations, when in the purging configuration, the second port is fluidly connected to the fresh air intake of the propulsion system, and the first port is fluidly connected to the engine air intake of the propulsion system. When in the loading configuration, the first port is fluidly connected to the exhaust manifold of the propulsion system, and the second port is fluidly connected to the exhaust port of the propulsion system.

In some implementations, the filter assembly includes first and second filter assemblies configurable such that when the internal combustion engine is below the threshold effective engine speed, one of the first and second filter assemblies is in the loading configuration, the other one of the first and second filter assemblies is in the purging configuration, and when the internal combustion engine is above the threshold effective engine speed, the first and second filter assemblies are both in the purging configuration.

In some implementations, the propulsion system further includes a valve assembly fluidly connected to the first port of the first and second filter assemblies, an auxiliary exhaust conduit extending between the exhaust manifold and the valve assembly, and a purged air conduit extending between the valve assembly and the engine air intake.

In some implementations, each valve assembly includes a three-port two-way valve.

In some implementations, the propulsion system further includes a valve disposed between the fresh air intake and the engine air intake.

In some implementations, at least one of the first and second filter assemblies switches between the loading and purging configurations after a predetermined amount of time.

In some implementations, at least one of the first and second filter assemblies switches between the loading and purging configurations when the at least one of the first and second filter assemblies contains an estimated load of the components of the exhaust gas.

In some implementations, the propulsion system further includes a control unit and at least one of an exhaust gas component sensor operatively connected to the control unit and being connected to the propulsion system between the first and second filter assemblies and the exhaust port, and a mapping table preprogrammed in the control unit and taking into account operating conditions of the internal combustion engine. The estimated load of the components of the exhaust gas within each of the first and second filter assemblies is determined by the control unit.

In some implementations, each of the first and second filter assemblies further includes a valve assembly fluidly connected to the first port, an auxiliary exhaust conduit extending between the exhaust manifold and the valve assembly, a purged air conduit extending between the valve assembly and the engine air intake, and the control unit is operatively connected to each valve assembly for switching each of the first and second filter assemblies between the loading and purging configurations.

In some implementations, a catalytic converter is connected to the propulsion system.

In some implementations, the exhaust gas flows through the filter assembly from the first port to the second port in the loading configuration, and the fresh air flows through the filter assembly from the second port to the first port in the purging configuration.

In some implementations, the propulsion system is a marine outboard engine for propelling a watercraft, and the exhaust port of the propulsion system includes at least one of a main exhaust port extending below a water line and a cowling port extending above the water line.

In some implementations, the filter assembly is disposed beneath a cowling of the marine outboard engine, and rearward of the internal combustion engine.

In some implementations, the fresh air intake corresponds to the exhaust port.

In some implementations, the fresh air intake corresponds to the cowling port.

In some implementations, the exhaust port includes first and second exhaust port, the fresh air intake includes first and second fresh air intakes, the first filter assembly is fluidly connected between the exhaust manifold and the first exhaust port when in the loading configuration, the first filter assembly is fluidly connected between the first fresh air intake and the engine air intake when in the purging configuration, the second filter assembly is fluidly connected between the exhaust manifold and the second exhaust port when in the loading configuration, and the second filter assembly is fluidly connected between the second fresh air intake and the engine air intake when in the purging configuration.

In some implementations, the first fresh air intake corresponds to the first exhaust port and the second fresh air intake corresponds to the second exhaust port.

In some implementations, the propulsion system includes a main exhaust conduit fluidly connected between the exhaust manifold and the main exhaust port, an auxiliary exhaust conduit fluidly connected to the main exhaust conduit and extending between the main exhaust conduit and the filter assembly, and a purged air conduit extending between the filter assembly and the engine air intake.

In some implementations, when in the loading configuration, the filter assembly is fluidly connected between the main exhaust conduit and the cowling port through the auxiliary exhaust conduit.

In some implementations, the propulsion system further includes a water sprayer connected inside the main exhaust conduit for spraying water therein, and a water sprayer valve that is closable when the filter assembly is in the loading configuration, such that the spraying of water inside the main exhaust conduit is prevented.

In some implementations, the main exhaust conduit includes a water jacket.

In some implementations, the propulsion system further includes heating channels defined within the internal combustion engine and extending between the fresh air intake and the filter assembly, such that when the filter assembly is in the purging configuration, fresh air is heated up before passing through the filter assembly and on to the engine air intake.

In some implementations, the internal combustion engine is a stratified charge engine.

In accordance with another aspect of the present technology, there is provided a vehicle having a propulsion system as described above.

In accordance with yet another aspect of the present technology, there is provided a method for treating exhaust gas of an internal combustion engine in a propulsion system. The method involves passing the exhaust gas through a first filter assembly that is fluidly connected between an exhaust manifold and an exhaust port of the propulsion system for loading at least some of the components of the exhaust gas therein while simultaneously passing fresh air through a second filter assembly that is fluidly connected between a fresh air intake and an engine air intake of the propulsion system for purging therefrom the at least some of the components of the exhaust gas when the internal combustion engine is operated below a threshold effective engine speed of the internal combustion engine, switching fluid connections of the first and second filter assemblies, and following the switching, passing the exhaust gas through the second filter assembly that is fluidly connected between the exhaust manifold and the exhaust port of the propulsion system for loading the at least some of the components of the exhaust gas therein while simultaneously passing fresh air through the first filter assembly that is fluidly connected between the fresh air intake and the engine air intake of the propulsion system for purging therefrom the at least some of the components of the exhaust gas.

In some implementations, the method further involves heating up fresh air before passing through a corresponding one of the first and second filter assemblies.

In some implementations, switching the fluid connections is performed after a predetermined amount of time has elapsed since exhaust gas has started passing through the first filter assembly.

In some implementations, switching the fluid connections is performed when the first filter assembly contains an estimated load of the components of the exhaust gas.

In some implementations, the method further involves passing the exhaust gas through a catalytic converter.

In some implementations, the method further involves further switching fluid connections of the first and second filter assemblies, and following the further switching, passing fresh air through both the first and second filter assemblies that are fluidly connected between the fresh air intake and the engine air intake of the propulsion system for purging therefrom the at least some of the components of the exhaust gas when the internal combustion engine is operated above the threshold effective engine speed of the internal combustion engine.

For purposes of the present application, the propulsion system that is described and represented in the figures as an exemplary implementation of the present technology is a marine outboard engine for propelling a watercraft. In the present application, the terms related to spatial orientation when referring to the outboard engine and components in relation to the outboard engine, such as "front", "rear", "left", "right", "above" and "below", are as they would be understood by a driver of a boat to which the outboard engine is connected, with the marine outboard engine connected to the stem of the boat, in a straight ahead orientation (i.e. not steered left or right), and in an upright position (i.e. not tilted and not trimmed).

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Should there be any difference in the definitions of term in this application and the definition of these terms in any document included herein by reference, the terms as defined in the present application take precedence.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 3A is a schematic view of internal components of the marine outboard engine of FIG. 1, with a filter assembly in a loading configuration;

FIG. 3B is a schematic view of the internal components of FIG. 3A, with the filter assembly in a purging configuration;

FIG. 4A is a cross-sectional schematic view of a filter of the filter assembly of FIG. 3B showing the flow of fresh air when in the purging configuration;

FIG. 4B a cross-sectional schematic view of the filter of the filter assembly of FIG. 3A showing the flow of exhaust gas when in the loading configuration;

DETAILED DESCRIPTION

The present technology will be described herein with respect to a propulsion system in the form of a marine outboard engine used for propelling a watercraft. However, it is contemplated that at least some aspects of the present technology could be used or adapted for use on other kinds of propulsion systems, such as, and not limited to, a propulsion system for a snowmobile, a personal watercraft, an all-terrain vehicle, or a road vehicle.

Figure 1:
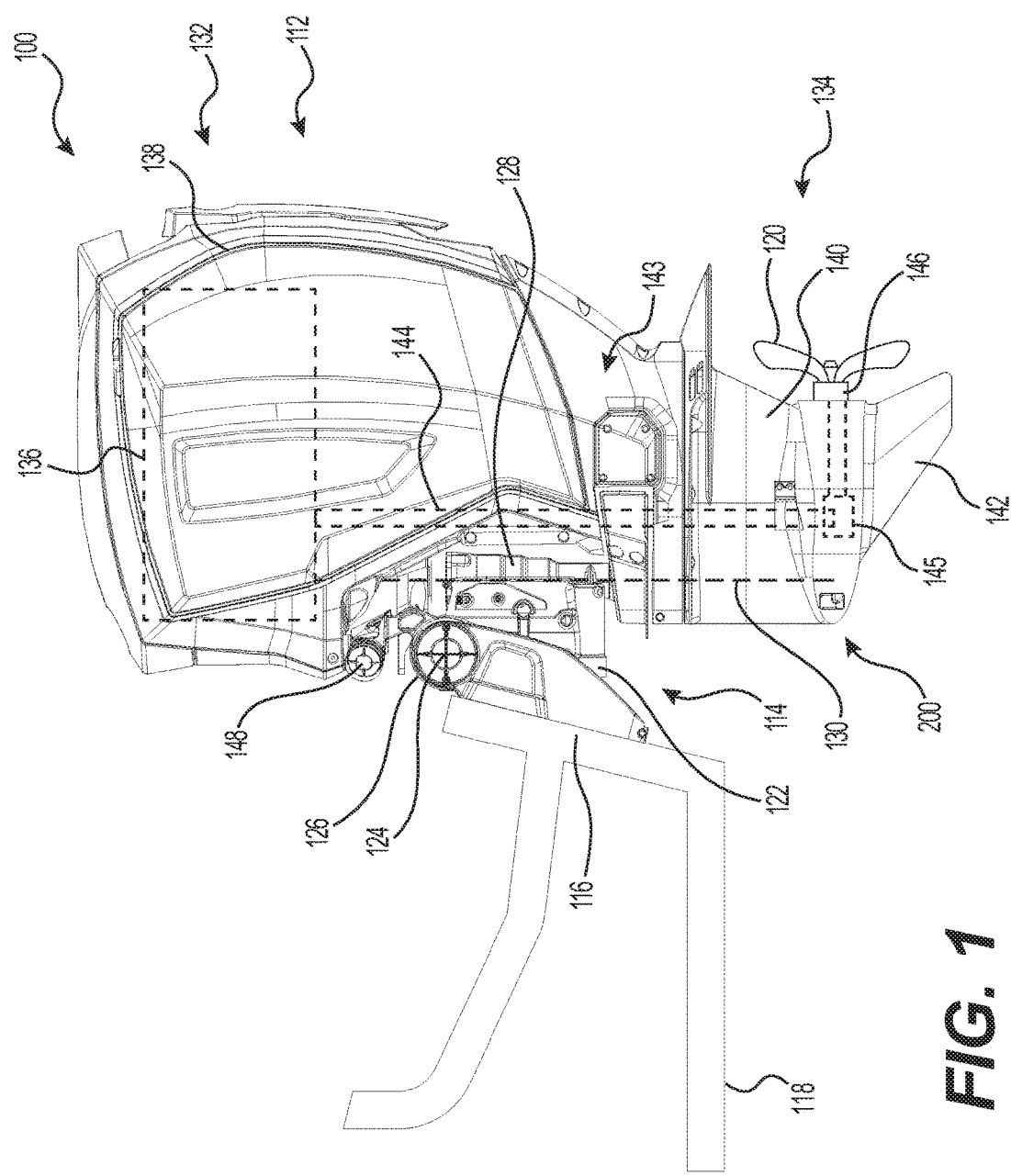
FIG. 1 is a left side elevation view of a marine outboard engine mounted to a stern of a boat.

With reference to FIG. 1, a marine outboard engine 100, shown in the upright position, includes a drive unit 112 and a bracket assembly 114. The bracket assembly 114 supports the drive unit 112 on a transom 116 of a hull 118 of an associated watercraft (not shown) such that a propeller 120 is in a submerged position with the watercraft resting relative to a surface of a body of water. The drive unit 112 can be trimmed up or down relative to the hull 118 by linear actuators 122 of the bracket assembly 114 about a tilt/trim axis 124 extending generally horizontally. The drive unit 112 can also be tilted up or down relative to the hull 118 by a rotary actuator 126 of the bracket assembly 114 about the tilt/trim axis 124. The drive unit 112 can also be steered left or right relative to the hull 118 by another rotary actuator 128 of the bracket assembly 114 about a steering axis 130. The steering axis 130 extends generally perpendicularly to the tilt/trim axis 124. When the drive unit 112 is in the upright position as shown in FIG. 1, the steering axis 130 extends generally vertically.

The drive unit 112 includes an upper portion 132 and a lower portion 134. The upper portion 132 includes an engine 136 (schematically shown in dotted lines) surrounded and protected by a cowling 138. The engine 136 housed within the cowling 138 is an internal combustion engine, such as a two-stroke or four-stroke internal combustion engine, having cylinders extending generally horizontally when the drive unit 112 is in an upright position as shown. The engine 136 is a stratified charge engine. As will be appreciated by one skilled in the art, stratified charge engines can benefit from a leaner air/fuel ratio and lower exhaust temperature. It is contemplated that other types of engines could be used and that the cylinders could be oriented differently. The lower portion 134 includes the gear case assembly 200, which includes a gear case 140, the propeller 120, and the skeg 142. A midsection 143 is connected between the engine 136 and the gear case 140. The midsection 143 houses a portion of an exhaust system 300 (FIG. 2) of the marine outboard engine 100.

Figure 2:
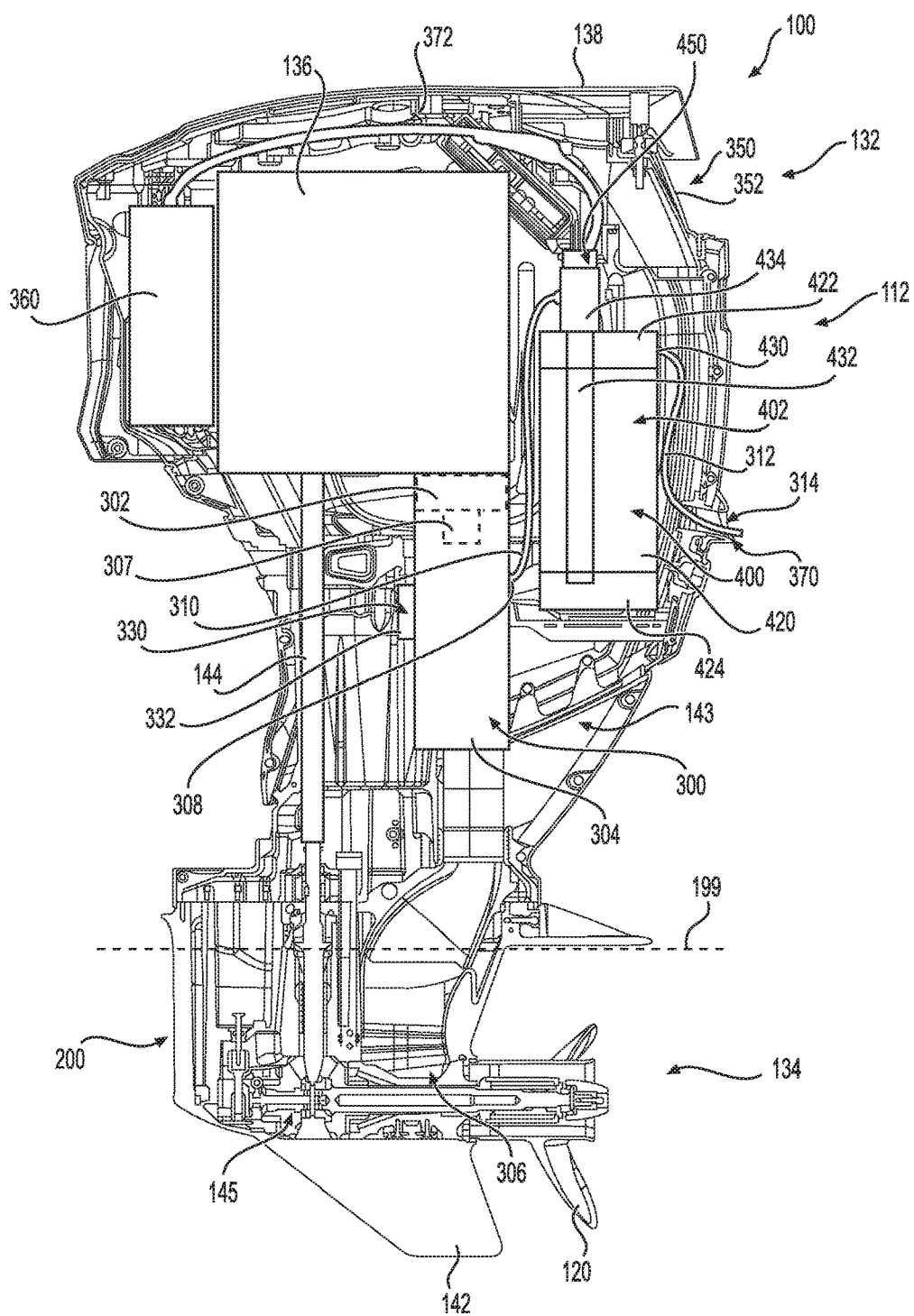
FIG. 2 is a vertical cross-sectional view of the marine outboard engine of FIG. 1, with various components schematically shown.

The engine 136 is coupled to a driveshaft 144 (schematically shown in dotted lines in FIGS. 1 and 2). When the drive unit 112 is in the upright position, the driveshaft 144 is oriented vertically. It is contemplated that the driveshaft 144 could be oriented differently relative to the engine 136. The driveshaft 144 is disposed in the cowling 138, passes through the midsection 143 and is coupled to a drive mechanism, which includes a transmission 145 and the propeller 120 mounted on a propeller shaft 146. It is contemplated that the driveshaft 144 could not pass through the midsection 143. In FIG. 1, the propeller shaft 146 is perpendicular to the driveshaft 144. It is contemplated that the propeller shaft 146 could be disposed at other angles relative to the driveshaft 144. The driveshaft 144 and the transmission 145 transfer the power of the engine 136 to the propeller 120 mounted on the rear side of the gear case 140 of the drive unit 112. It is contemplated that the propulsion system of the marine outboard engine 100 could alternatively include a jet propulsion device, a turbine or other known propelling device.

To facilitate the installation of the marine outboard engine 100 on the watercraft, the marine outboard engine 100 is provided with a connection box 148. The connection box 148 is connected on top of the rotary actuator 126. As a result, the connection box 148 pivots about the tilt/trim axis 124 when the drive unit 112 is tilted, but does not pivot about the steering axis 130 when the drive unit 112 is steered. It is contemplated that the connection box 148 could be mounted elsewhere on the bracket assembly 114 or on the drive unit 112. Devices located inside the cowling 138 which need to be connected to other devices disposed externally of the marine outboard engine 100, such as on the deck or hull 118 of the watercraft, are provided with lines which extend inside the connection box 148. Similarly, the corresponding devices disposed externally of the marine outboard engine 100 are also provided with lines that extend inside the connection box 148 where they are connected with their corresponding lines from the marine outboard engine 100. It is contemplated that one or more lines could be connected between one or more devices located inside the cowling 138 to one or more devices located externally of the marine outboard engine 100 and simply pass through the connection box 148. It is contemplated that the connection box 148 could be omitted.

Other known components of an engine assembly are included within the cowling 138, such as a starter motor and an alternator. As it is believed that these components would be readily recognized by one of ordinary skill in the art, further explanation and description of these components will not be provided herein.

With reference to FIGS. 2 to 3B, the exhaust system 300, an air intake system 350, a filter assembly 400, a valve assembly 450 and a control unit 500 according to one implementation of present technology will be described. Broadly described and for a better understanding of the present description, the filter assembly 400 is configurable between a loading configuration, schematically shown in FIG. 3A, allowing for a filtration of at least some of the components of the exhaust gas of the engine 136, and a purging configuration, schematically shown in FIG. 3B, allowing for a removal of the at least some of the components of the exhaust gas from the filter assembly 400. As such, when in the loading configuration, the exhaust gas is passed through the filter assembly 400. The loading and the purging configurations, and the switching between the loading and the purging configurations, will be described in more detail below.

The exhaust system 300 is shown in FIGS. 2 to 7 in its upright position which corresponds to the position of the exhaust system 300 when the marine outboard engine 100 is positioned as shown in FIG. 1. Referring to FIG. 2, the exhaust system 300 includes an exhaust manifold 302 (schematically shown in dotted lines in FIGS. 2 to 7). The exhaust manifold 302 is fluidly connected to the engine 136 and collects exhaust gas generated by combustion events occurring in the engine 136. A main exhaust conduit 304 is fluidly connected to the exhaust manifold 302. The main exhaust conduit 304 extends vertically between the exhaust manifold 302 and a main exhaust port 306 (FIG. 2) through the midsection 143 of the marine outboard engine 100. The main exhaust port 306 is defined forward of the propeller 120 in the lower portion 134 of the marine outboard engine 100.

When the marine outboard engine 100 is positioned in its upright position, as shown in FIG. 2, the main exhaust port 306 is submerged and extends below a water line 199 (schematically shown in dotted line in FIG. 2). When the marine outboard engine 100 propels the watercraft at high speeds, the exhaust gas is at high pressure within the main exhaust conduit 304 and/or a low pressure zone is formed behind the main exhaust port 306, and the exhaust gas is discharged through the main exhaust port 306. The marine outboard engine 100 further includes a catalytic converter 307. The exhaust gas passes through the catalytic converter 307 before being discharged through the main exhaust port 306. It is contemplated that, in some implementations, the exhaust gas could bypass the catalytic converter 307 and be fed directly to the filter assembly 400 when in the loading configuration. As such, in some implementations, the exhaust gas passes through the catalytic converter 307 and/or the filter assembly 400 when in the loading configuration. When in the loading configuration, the exhaust gas passes through the catalytic converter 307. In some implementations, the exhaust gas generated by the engine 136 has a temperature comprised between 40° C. and 600° C. It is also contemplated that the catalytic converter 307 could be omitted.

Figure 3C:
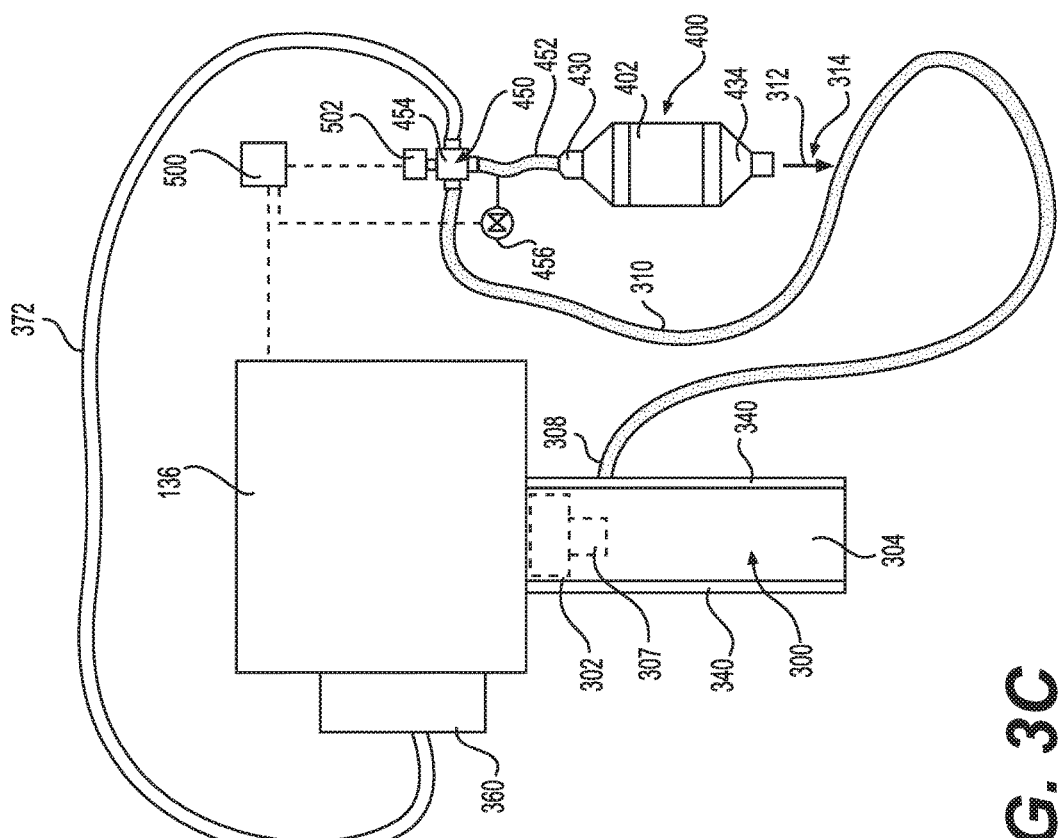
FIG. 3C is a schematic view of the internal components of FIG. 3A, with a water jacket.

When the marine outboard engine 100 is powered off, at idle or propels the watercraft at slow speeds, the main exhaust port 306 is filled with water. In order to discharge the exhaust gas when the engine 136 is at idle or when the engine 136 propels the watercraft at slow speeds, an idle relief exhaust connector port 308 is provided on the main exhaust conduit 304, in the midsection 143 of the marine outboard engine 100. An auxiliary exhaust conduit 310 is fluidly connected to the idle relief exhaust connector port 308. The auxiliary exhaust conduit 310 extends between the main exhaust conduit 304 and the valve assembly 450 (FIGS. 3A to 3C). The fluid connection between the valve assembly 450 and the filter assembly 400 will be described below. The auxiliary exhaust conduit 310 allows fluid passage of the exhaust gas from the main exhaust conduit 304 to the filter assembly 400 when the filter assembly 400 is in the loading configuration (FIG. 3A). A conduit 312 (shown in FIG. 2 and schematically shown as an arrow in FIGS. 3A to 3C) is fluidly connected to the filter assembly 400 and extends between the filter assembly 400 and a cowling port 314 defined in the rear portion of the cowling 138 of the marine outboard engine 100. The cowling port 314 could be defined elsewhere on the marine outboard engine 100 above the water line 199. However, defining the cowling port 314 in the rear portion of the cowling 138 of the marine outboard engine 100 results in the exhaust gas being discharged away from the watercraft.

Referring to FIG. 3A, when the filter assembly 400 is in the loading configuration, the conduit 312 discharges the exhaust gas that has passed through the filter assembly 400 through the cowling port 314. As such and as seen in FIG. 3A, in the loading configuration, the filter assembly 400 is fluidly connected between the exhaust manifold 302 and the cowling port 314 of the marine outboard engine 100. In some implementations, the filter assembly 400 also acts as a muffler of the marine outboard engine 100 and enables the omission of a separate idle relief muffler.

The exhaust system 300 further includes a water sprayer assembly 330 (schematically shown in FIGS. 2 to 3B). The water sprayer assembly 330 is connected to the main exhaust conduit 304. The water sprayer assembly 330 includes a water sprayer 332 (schematically shown in FIG. 2). The water sprayer 332 sprays water inside the main exhaust conduit 304 when the filter assembly 400 is in the purging configuration. Spraying water inside the main exhaust conduit 304 cools the exhaust gas that is discharged through the main exhaust conduit 304 and on to the main exhaust port 306. The water sprayer assembly 330 further includes a water sprayer valve (not shown) that is connected to the water sprayer 332. When the filter assembly 400 is in the loading configuration, the water sprayer valve is closed to prevent spraying of water inside the main exhaust conduit 304.

In an alternative implementation shown in FIG. 3C, the water sprayer assembly 330 is omitted and the main exhaust conduit 304 includes a water jacket 340 inside which water is circulated without mixing with the exhaust gas. The water jacket 340 allows for the cooling of the exhaust gas discharged through the main exhaust conduit 304 regardless whether the filter assembly 400 is in the loading or purging configuration. In such an implementation, exhaust gas having a temperature above a threshold operating temperature for the filter assembly 400 can be cooled down to a temperature below the threshold operating temperature before being passed through the filter assembly 400 when in the loading configuration.

Referring back to FIG. 2, the air intake system 350 of the marine outboard engine 100 will be described. The air intake system 350 includes a main fresh air intake 352 defined in the rear portion of the cowling 138 of the marine outboard engine 100 and in the upper portion 132 thereof. Defining the main fresh air intake 352 in the upper rear portion of the cowling 138 of the marine outboard engine 100 helps prevent water from entering the air intake system 350 when the watercraft is propelled forward by the marine outboard engine 100. In some implementations, the main fresh air intake 352 includes at least one of baffles, screens and filters that filter the fresh air entering the main fresh air intake 352. The main fresh air intake 352 is fluidly connected to an engine air intake 360 that feeds the fresh air to the engine 136. The main fresh air intake 352 feeds a majority of the air required by the engine 136 to operate.

Referring to FIGS. 2 to 3C, an auxiliary fresh air intake 370 is also defined in the rear portion of the cowling 138 of the outboard engine 100. In the illustrated implementation, the auxiliary fresh air intake 370 corresponds to the cowling port 314, but it could be defined otherwise. In some implementations, the auxiliary fresh air intake 370 includes baffles that help remove any moisture from the fresh air entering the auxiliary fresh air intake 370. In yet another implementation, the main fresh air intake 352 and the auxiliary fresh air intake 370 may correspond and form a single fresh air intake for the propulsion system. In the present implementation, the auxiliary fresh air intake 370 feeds fresh air to the filter assembly 400 through the conduit 312 when the filter assembly 400 is in the purging configuration. A purged air conduit 372 (best seen in FIGS. 3A to 3C) extends between the valve assembly 450 and the engine air intake 360. When the filter assembly 400 is in the purging configuration, the air that has passed through the filter assembly 400, hereinafter referred to as "purged air", is fed to the engine air intake 360 through purged air conduit 372. As such and as seen in FIG. 3B, in the purging configuration, the filter assembly 400 is fluidly connected between the auxiliary fresh air intake 370 and the engine air intake 360 of the marine outboard engine 100. The auxiliary fresh air intake 370 feeds a minority of the air required by the engine 136 to operate. In some implementations, the purged air represents about 10% of the air that is fed to the engine air intake 360, although greater or lesser proportions are contemplated.

In some implementations, the air intake system 350 further includes heating channels 380 defined within the engine 136 (shown in FIG. 3B). In such an implementation, when the filter assembly 400 is in the purging configuration, fresh air enters the auxiliary fresh air intake 370, passes through the heating channels 380 before passing through the filter assembly 400, the purged air conduit 372 and on to engine air intake 360. In such implementations, heating up the fresh air before passing it through the filter assembly 400 enhances the removal of some of the components of the exhaust gas from the filter assembly 400. In some implementations, the fresh air is heated up to about 100° C. before passing through the filter assembly 400.

Referring to FIGS. 2, 4A and 4B, the filter assembly 400 will be described. The filter assembly 400 is disposed beneath the cowling 138 of the marine outboard engine 100, and rearward of the engine 136. The filter assembly 400 includes a filter 402. The filter 402 includes an adsorbent material that can trap at least some of the components of the exhaust gas and subsequently desorb these components. Adsorbent material includes, and is not limited to, activated or active carbon, charcoal or coke, as well as molecular sieves made of zeolite. For example, activated carbon is known for its capabilities of adsorbing and desorbing hydrocarbons. As such, in implementations where the filter 402 includes activated carbon, when the filter assembly 400 is in the loading configuration, the filter 402 removes, through adsorption, at least some of the hydrocarbons from the exhaust gas passing through the filter assembly 400. The filter 402 fills up with the hydrocarbons of the exhaust gas and eventually reaches a maximum load, i.e. the filter 402 no longer removes the hydrocarbons from the exhaust gas. When the filter assembly 400 is in the purging configuration and fresh air is fed through the filter 402 and past the activated carbon, at least some of the hydrocarbons retained by the activated carbon are removed therefrom through desorption and are fed back to the engine 136 along with the purged air, thus allowing for further adsorption of hydrocarbons by the filter 402 when configured back into the loading configuration. It is to be noted that, in some implementations, the filter 402 further includes an absorbent material. It is contemplated that the filter 402 of the filter assembly 400 could be selected in order to remove specific undesirable components or specific compounds of the exhaust gas. The filter 402 could also include a mix of different of adsorbent materials.

The filter assembly 400 is configured in the purging configuration when the engine 136 operates above a threshold effective engine speed. For instance, the threshold effective engine speed could be that the engine operates at or below 1000 rpm. The threshold effective engine speed can also be an equivalent measurement of the operating conditions of the internal combustion engine 136, such as engine torque, engine torque request, throttle position or any other parameter which can affect engine speed, either alone or in combination. The threshold effective engine speed can be selected so as to prevent damage to, and not limited to, the adsorbent material contained in the filter 402.

Referring to FIGS. 4A and 4B, the filter 402 of the filter assembly 400 includes a hollow body 410. The hollow body 410 has a top wall 412, a bottom wall 414 and lateral walls

416. A compartment 420 for containing the adsorbent material is defined in the hollow body 410. The compartment 420 is defined between porous walls, such as a mesh or a grid, allowing for fluid flow therethrough. In some implementations, the compartment 420 contains pelletized activated carbon. The compartment 420 extends vertically between the top and bottom walls 412, 414. An upper chamber 422 is defined in the hollow body 410. The upper chamber 422 extends vertically between the top wall 412 and the compartment 420. A lower chamber 424 is defined in the hollow body 410. The lower chamber 424 extends vertically between the bottom wall 414 and the compartment 420. A conduit 429 extends through one of the lateral walls 416 and defines a first port 430. The conduit 429 and the first port 430 allow for fluid connection between the upper chamber 422 and an exterior of the hollow body 410. The filter 402 further includes a filter conduit 432 extending from the lower chamber 424, through the compartment 420 and through the top wall 412. The filter conduit 432 defines a second port 434. The filter conduit 432 and the second port 434 allow for fluid connection between the lower chamber 424 and the exterior of the hollow body 410. As such, the compartment 420 is fluidly connected between the first port 430 and the second port 434. The filter 402 further includes a drain 440 provided in the bottom wall 414 of the hollow body 410 for draining a liquid out thereof. For example, the liquid could be water separated from the fresh air since, in the purging configuration (FIG. 4A), the fresh air flows downwardly through the filter conduit 432, flows in the lower chamber 424 and is directed upwardly through the adsorbent material.

Referring to FIGS. 2, 3A and 4B illustrating the filter assembly 400 in the loading configuration, the exhaust gas flowing from the exhaust system 300 flows through the auxiliary exhaust conduit 310, enters the filter 402 through the first port 430 and flows in the upper chamber 422. The exhaust gas then flows downwardly through the compartment 420 and is exposed to the adsorbent material such that the exhaust gas is filtered, i.e. at least some of its components are removed therefrom through adsorption. The exhaust gas flows in the lower chamber 424 and then flows upwardly through the filter conduit 432 and exits the filter 402 through the second port 434, and flows through the conduit 312 and on to the cowling port 314. As such, in the loading configuration, the first port 430 is fluidly connected to the exhaust manifold 302, and the second port 434 is fluidly connected to the cowling port 314 of the marine outboard engine 100.

Referring to FIGS. 2, 3B and 4A illustrating the filter assembly 400 in the purging configuration, the fresh air flows from the auxiliary fresh air intake 370, through the conduit 312 and enters the filter 402 through the second port 434 and flows downwardly through the filter conduit 432 and into the lower chamber 424. The fresh air then flows upwardly through the compartment 420 and is exposed to the adsorbent material such that the fresh air removes therefrom at least some of the components of the exhaust gas through desorption. The fresh air thus becomes purged air. The purged air then flows in the upper chamber 422 and exits the filter 402 through the first port 430, flows through the purged air conduit 372 and on to the engine air intake 360. As such, in the purging configuration, the second port 434 is fluidly connected to the auxiliary fresh air intake 370, and the first port 430 is fluidly connected to the engine air intake 360 of the engine 136. As schematically indicated by the arrows shown in FIGS. 4A and 4B, a fluid path 436 between the first port 430 and the second port 434 is tortuous.

Referring to FIGS. 3A and 3B, the valve assembly 450 will be described. The valve assembly 450 is fluidly connected to the filter assembly 400 through a conduit 452. More particularly, the conduit 452 fluidly connects the valve assembly 450 to the first port 430 of the filter 402. In some implementations, the conduit 452 could be omitted as the valve assembly 450 could be directly fluidly connected to the first port 430 of the filter 402. The valve assembly 450 is further fluidly connected to the auxiliary exhaust conduit 310 and to the purged air conduit 372. In the present implementation, the valve assembly 450 includes a three-port two-way valve 454. The three ports of the valve 454 are respectively fluidly connected to the conduit 452, the auxiliary exhaust conduit 310 and to the purged air conduit 372. As the valve 454 is a two-way valve, the valve 454 can be selectively configured either to allow fluid flow of the exhaust gas, i.e. configuring the filter assembly 400 in the loading configuration shown in FIG. 3A, or to allow fluid flow of purged air, i.e. configuring the filter assembly 400 in the purging configuration shown in FIG. 3B. As such, the valve assembly 450 causes the switching between the loading and purging configurations of the filter assembly 400. In the present implementation, the valve assembly 450 further includes a valve 456 disposed between the valve 454 and the filter assembly 400. The valve 456 could be part of the valve assembly 450. The valve 456 may be used in the loading configuration to manage the flow rate of the exhaust gas entering the filter assembly 400. In addition, as the valve 454 is disposed between the auxiliary fresh air intake 370 and the engine air intake 360, the valve 456 may also be used in the purging configuration to manage the flow rate of fresh air through the filter 402 and purged air to the engine air intake 360.

Still referring to FIGS. 3A and 3B, the control unit 500 will be described. The control unit 500 is a programmable electronic unit that is powered by the electrical system (not shown) of the marine outboard engine 100. The control unit 500 is operatively connected to the valve 456 and controls the operation of the valve 456. The control unit 500 is also operatively connected to an actuator 502. The actuator 502 is operatively connected to the valve assembly 450. The actuator 502 controls the operation of the three-port two-way valve 454. As such, the control unit 500 and the valve assembly 450 cause the filter assembly 400 to switch between the loading and purging configurations. The control unit 500 is also operatively connected to the engine 136. When the effective engine speed is above the threshold engine speed, the control unit 500 triggers the operation of the three-port two-way valve 454 through the actuator 502 such that the filter assembly 400 is configured in the purging configuration. When the effective engine speed is below the threshold engine speed, the control unit 500 triggers the operation of the three-port two-way valve 454 through the actuator 502 such that the filter assembly 400 is configured in the loading configuration.

Referring to FIGS. 5 to 9, an alternative implementation of the internal components of the marine outboard engine 100 is illustrated. The differences between the implementation shown in FIGS. 2 to 4B will be described. For simplicity, in the alternative implementation shown in FIGS. 5 to 9, the internal components described with reference to FIGS. 2 to 4B have the same reference numerals with, in some cases, A or B for identification.

Figure 6:
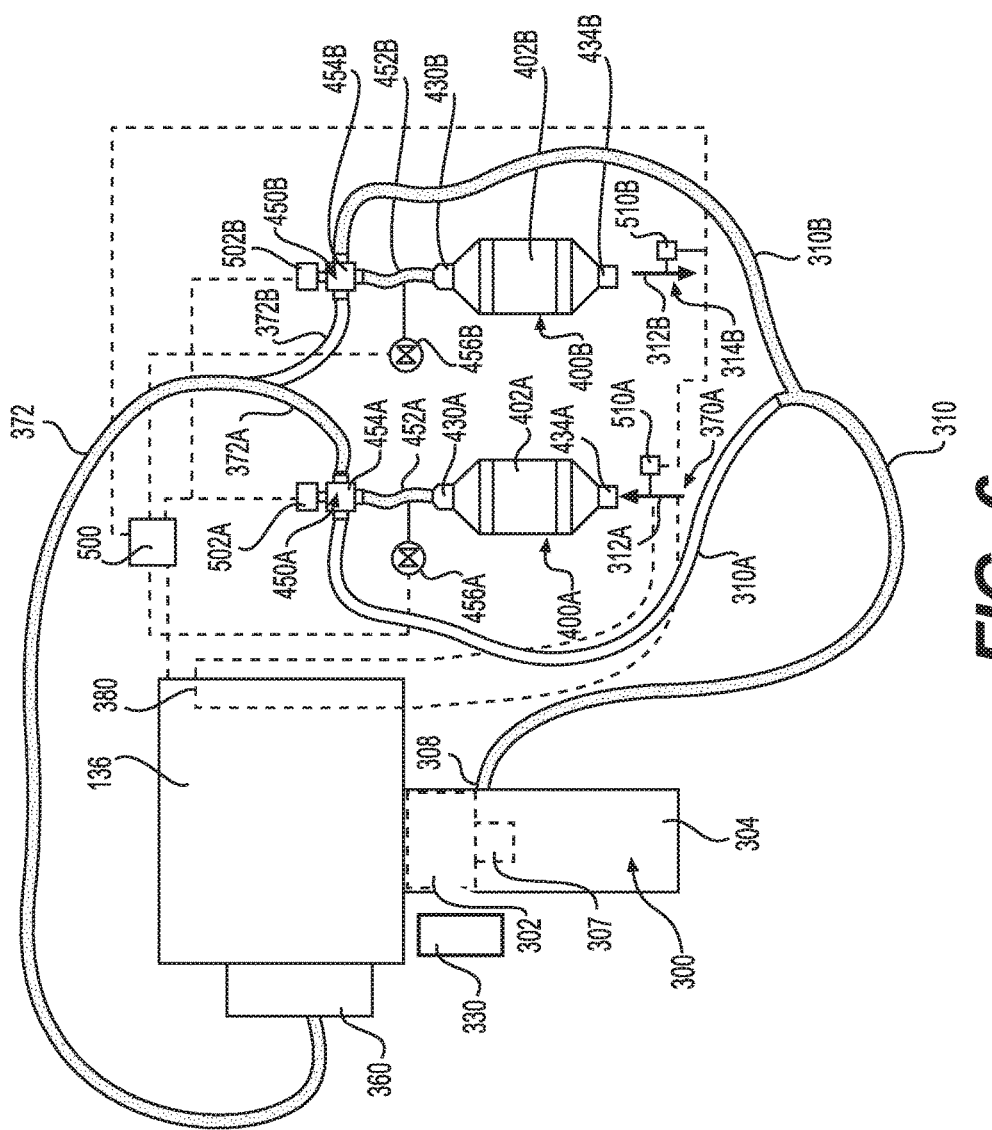
FIG. 6 is a schematic view of the internal components of FIG. 5, with the one filter assembly in the purging configuration and the other filter assembly in the loading configuration.
Figure 7:
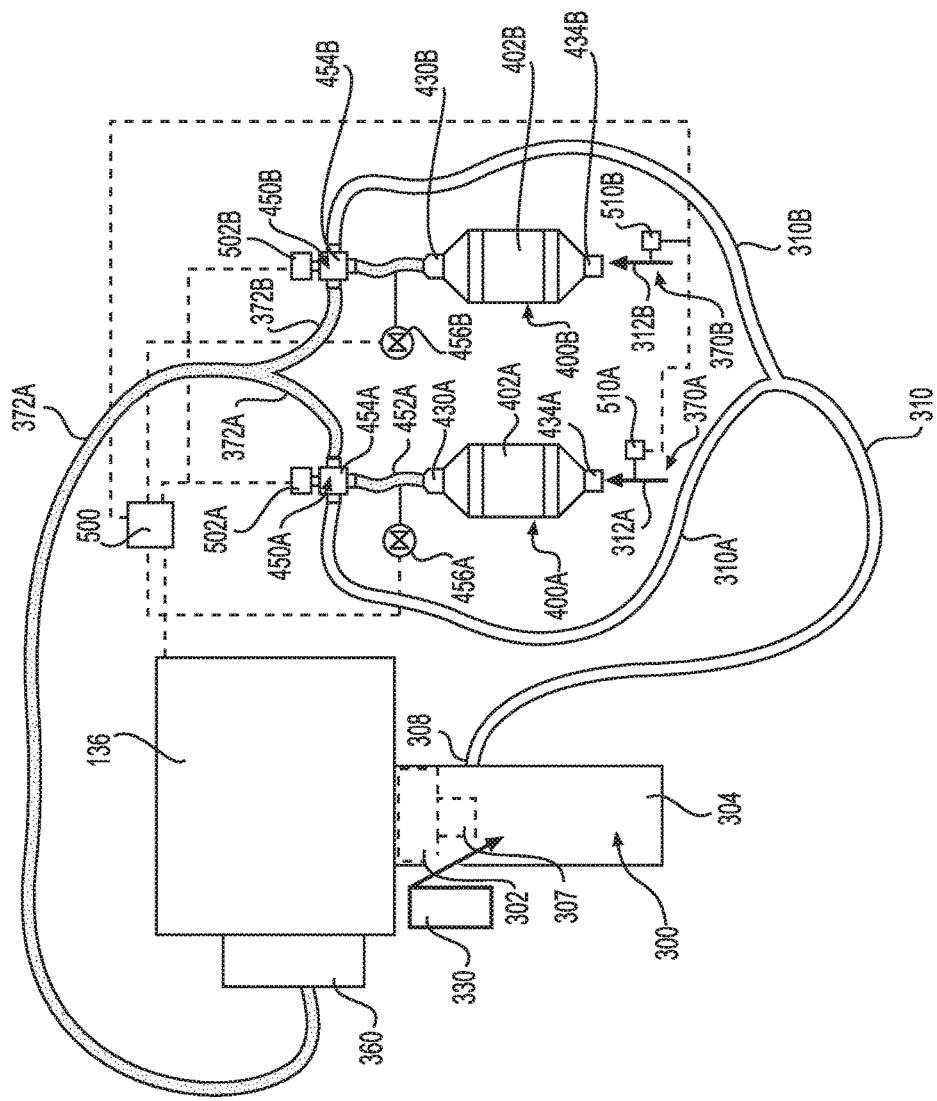
FIG. 7 is a schematic view of the internal components of FIG. 5, with both filter assemblies in the purging configuration.
Figure 8:
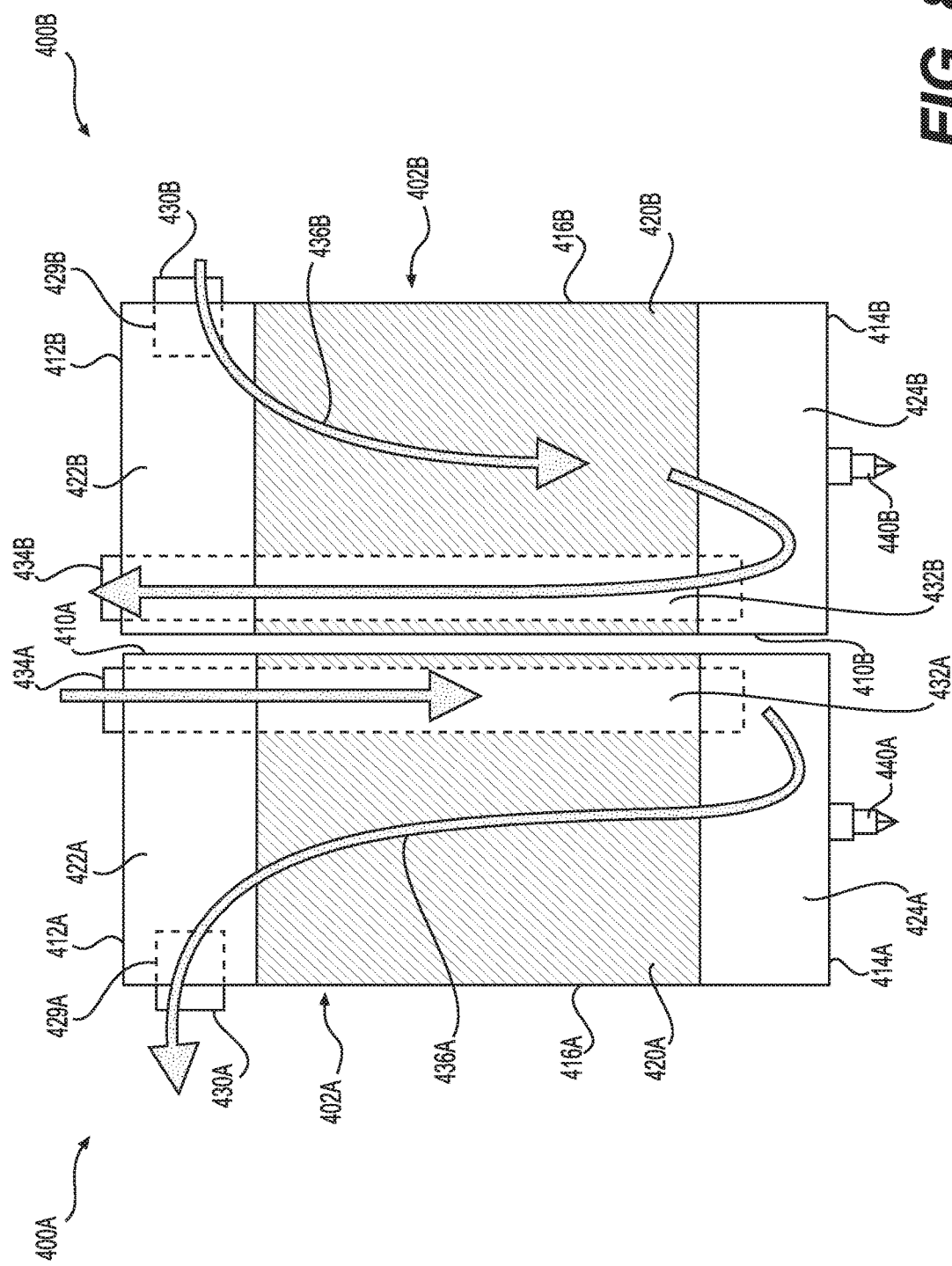
FIG. 8 is a cross-sectional schematic view of filters of the filter assemblies of FIG. 6.
Figure 9:
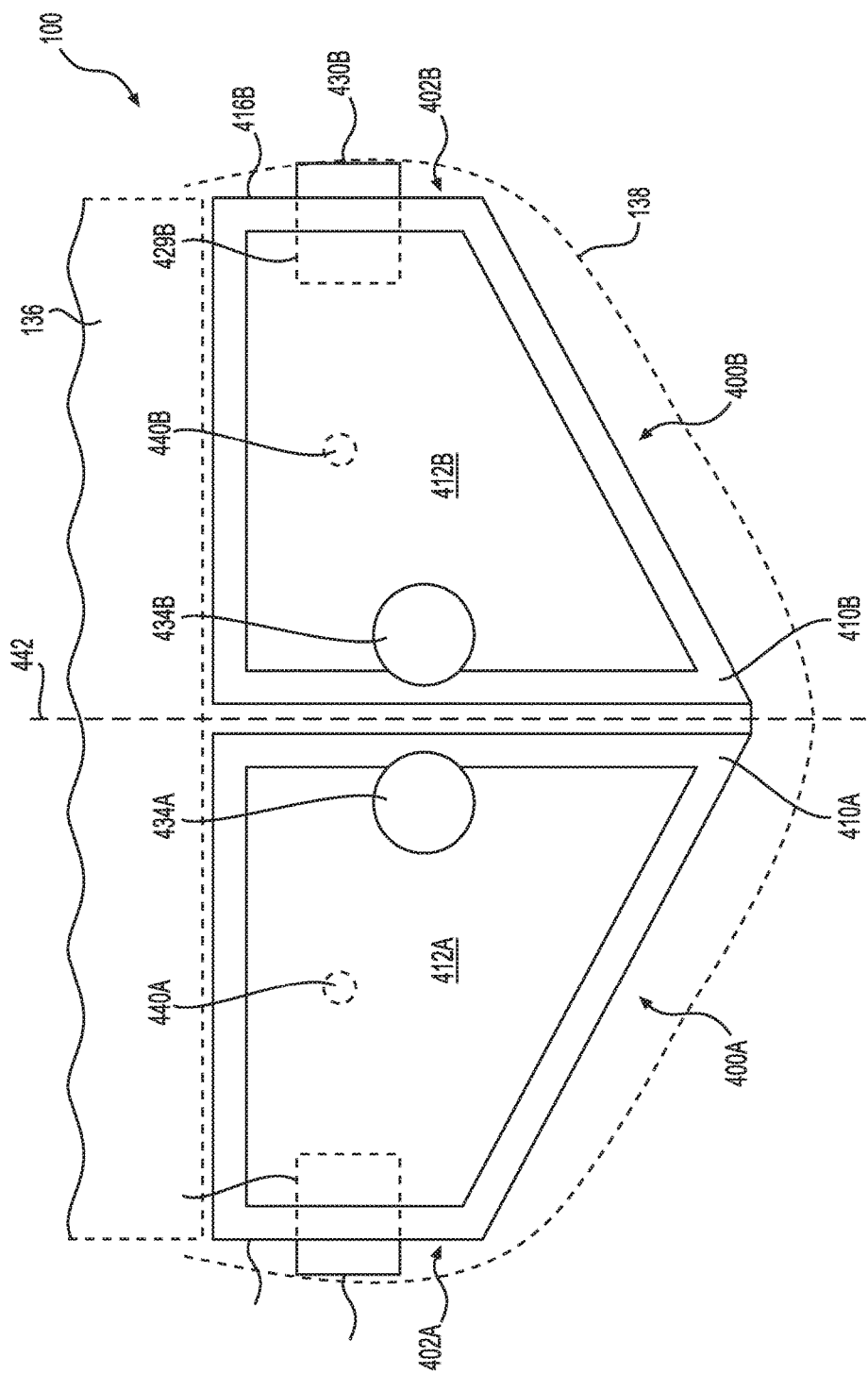
FIG. 9 is a top plan schematic view of the filters of FIG. 8.

In FIGS. 5 to 9, the filter assembly 400 is replaced by filter assemblies 400A, 400B. The filter assemblies 400A, 400B are similar to the filter assembly 400 described above, as seen in FIG. 8. The filter assemblies 400A, 400B are disposed beneath the cowling 138 of the marine outboard engine 100, rearward of the engine 136 and on either sides of a longitudinal centerline 442 of the marine outboard engine 100 (FIG. 9). The filter assemblies 400A, 400B include filters 402A, 402B respectively and are a mirror image of each other along the longitudinal centerline 442. As such, only the filter 402A will be described. Referring to FIGS. 8 and 9, the filter 402A has four lateral walls 410A: an angled rear-facing lateral wall, a front-facing lateral wall, a left-facing lateral wall and a right-facing lateral wall. The filter conduit 432A extends through the top wall 412A and is disposed in the mid-section of the right-facing lateral wall 410A. The conduit 429A extends through the left-facing lateral wall 410A in a mid-section thereof. The first port 430A is defined between the left-facing lateral wall 410A and the cowling 138 of the marine outboard engine 100. The drain 440A is disposed between the conduit 429A and the filter conduit 432A and about in a mid-section of the bottom wall 414A widthwise, i.e. between the left and right-facing lateral walls 410A.

Figure 5:
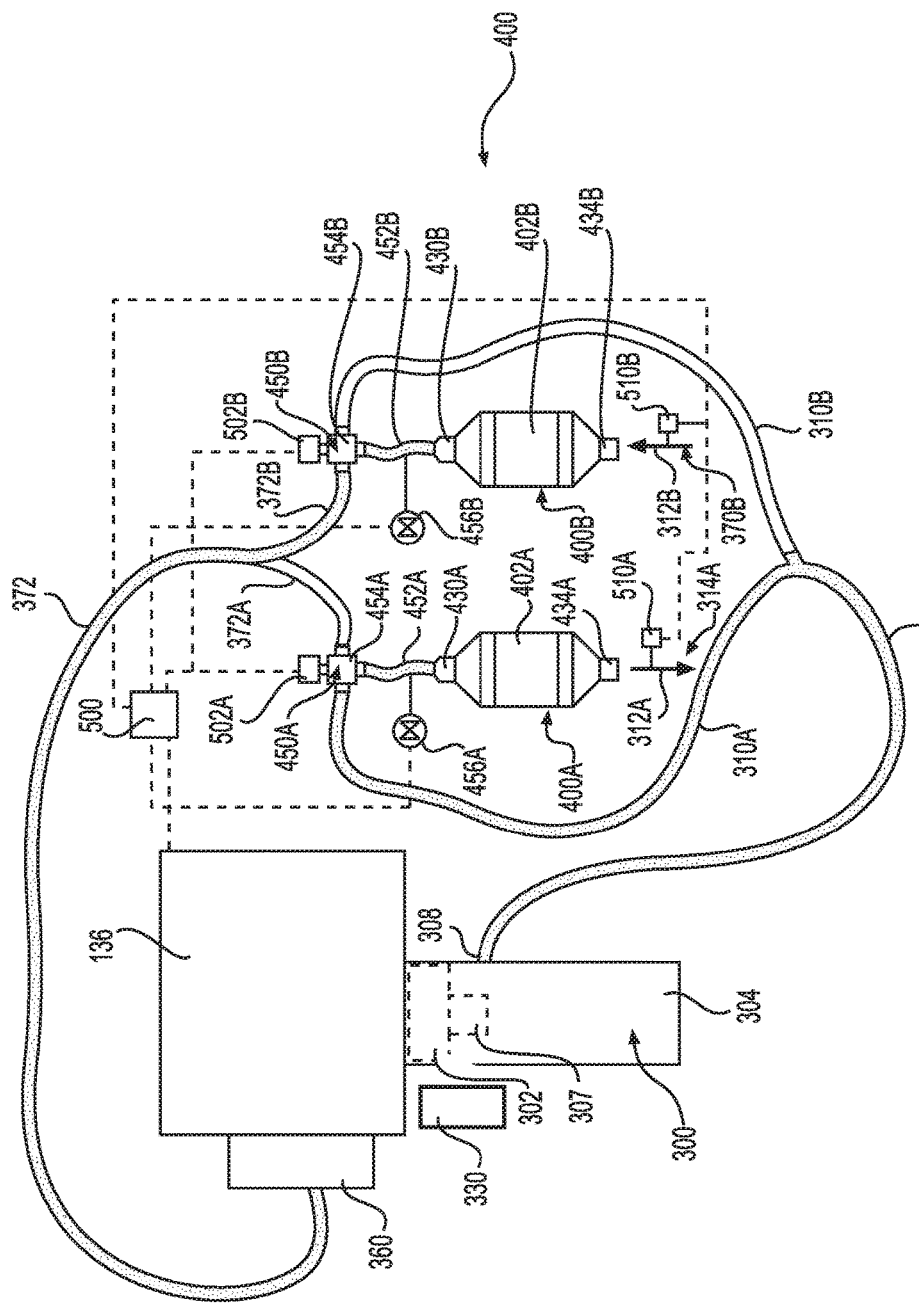
FIG. 5 is a schematic view of internal components of an alternative implementation of the marine outboard engine of FIG. 1, with one filter assembly in the loading configuration and another filter assembly in the purging configuration.

In FIGS. 5 to 7, the valve assembly 450 is replaced by valve assemblies 450A, 450B. The valve assemblies 450A, 450B are similar to the valve assembly 450 described above and are both operatively connected to a single control unit 500, similar to the one described above, through respective actuators 502A, 502B. The control unit 500 is also operatively connected to each one of the valves 456A, 456B. Moreover, in the present alternative implementation, the cowling port 314 is replaced by cowling ports 314A, 314B. The auxiliary fresh air intake 370 is replaced by auxiliary fresh air intakes 370A, 370B. The cowling port 314A and the auxiliary fresh air intake 370A are defined by a first opening (not shown) in the cowling 138 of the marine outboard engine 100 above the water line 199 (FIG. 2). The auxiliary fresh air intake 370A thus corresponds to the cowling port 314A. A conduit 312A extends between the filter assembly 400A and the cowling port 314A (FIG. 5). Similarly, the cowling port 314B and the auxiliary fresh air intake 370B are defined by a second opening (not shown) in the cowling 138 of the marine outboard engine 100 above the water line 199 (FIG. 2). The auxiliary fresh air intake 370B thus corresponds to the cowling port 314B. A conduit 312B extends between the filter assembly 400B and the cowling port 314B (FIG. 6).

Still referring to FIGS. 5 to 7, the auxiliary exhaust conduit 310 splits into auxiliary exhaust conduits 310A, 310B. In some implementations, the auxiliary exhaust conduit 310 is omitted and the auxiliary exhaust conduits 310A, 310B extend to the idle relief exhaust connector port 308. Similarly, the purged air conduit 372 splits into purged air conduits 372A, 372B. In some implementations, the purged air conduit 372 is omitted and the purged air conduits 372A, 372B extend to the engine air intake 360.

Referring to FIGS. 5 to 8, the operation of the alternative implementation of the marine outboard engine 100 will now be described. When the internal combustion engine 136 is below the threshold effective engine speed, the filter assemblies 400A, 400B are configurable such that the filter assembly 400A is in the loading configuration while the filter assembly 400B is in the purging configuration (FIG. 5), and the filter assembly 400A is in the purging configuration while the filter assembly 400B is in the loading configuration (FIGS. 6 and 8). The filter assemblies 400A, 400B can also be configured to be both in the purging configuration (FIG. 7) when the internal combustion engine 136 is above the threshold effective engine speed. In the present alternative implementation, the filter assemblies 400A, 400B are not configurable to be both in the loading configuration at the same time, but it is contemplated that they could be.

Referring to FIG. 5, the filter assembly 400A is in the loading configuration while the filter assembly 400B is in the purging configuration. These configurations are considered as an initial state for the purpose of the present description. In the initial state, the filter 402A is being loaded with some of the components of the exhaust gas while the filter 402B is being purged from some of the components of the exhaust gas. The exhaust gas exiting through the cowling port 314A and the fresh air entering the auxiliary air intake 370B flow in opposite directions through the filter assemblies 400A, 400B, respectively.

In some implementations, after a predetermined amount of time has elapsed since the exhaust gas has started passing through the filter assembly 400A, the control unit 500 triggers the operation of the three-port two-way valves 454A, 454B through the actuators 502A, 502B. Thus, the fluid connections of the filter assemblies 400A, 400B are switched: the filter assembly 400A is configured from the loading configuration into the purging configuration, and the filter assembly 400B is configured from the purging configuration into the loading configuration, as shown in FIG. 6. After the predetermined amount of time has elapsed since the exhaust gas has started passing through the filter assembly 400B, the control unit 500 triggers the operation of the three-port two-way valves 454A, 454B through the actuators 502A, 502B and the filter assemblies 400A, 400B are configured back into the initial state shown in FIG. 5 for a new cycle. Cycles are repeated as long as the engine 136 is operated below the threshold effective engine speed. The predetermined amount of time may be of 1 minute, 5 minutes, 10 minutes, 20 minutes or 60 minutes. Other predetermined amounts of time are contemplated. The switching between the loading and purging configurations of each filter assembly 400A, 400B (shown in FIGS. 5 and 6) allows for a continuous filtering of the exhaust gas.

In some implementations, the switching of the fluid connections of the filter assemblies 400A, 400B from the initial state is controlled by the control unit 500 using at least one of exhaust gas component sensors 510A, 510B and a preprogrammed mapping table. The operation of the exhaust gas component sensors 510A, 510B and of the preprogrammed mapping table will now be described.

In implementations including the exhaust gas component sensors 510A, 510B, the exhaust gas component sensors 510A, 510B are operatively connected to the control unit 500 and are connected to the marine outboard engine 100 between the filter assemblies 400A, 400B and the cowling ports 314A, 314B, along the conduit 312A, 312B, respectively. The exhaust gas component sensors 510A, 510B could be, for example, and not limited to, oxygen sensors, carbon monoxide sensors, hydrocarbon sensors or temperature sensors. The combination of the control unit 500 and of the exhaust gas component sensors 510A, 510B can allow for real-time analysis of the exhaust gas that has passed through the filter assemblies 400A, 400B when in the loading configuration. As the control unit 500 is operatively connected to the actuators 502A, 502B and to the exhaust gas component sensors 510A, 510B, one of the exhaust gas component sensors 510A, 510B is active when the three-port two-way valves 454A, 454B causes a corresponding one of the filter assemblies 400A, 400B to be in the loading configuration, and one of the exhaust gas component sensors 510A, 510B is inactive when a corresponding one of the filter assemblies 400A, 400B is in the purging configuration. For instance, referring to FIG. 5, the exhaust gas component sensor 510A is active because the filter assembly 400A is in the loading configuration, and the exhaust gas component sensor 510B is inactive because the filter assembly 400B is in the purging configuration.

Referring to FIG. 5, as the exhaust gas passes through the filter assembly 400A, it is expected that the filtering of the exhaust gas will become less effective with time as the adsorbent material within the filter assembly 400A loads with some of the components of the exhaust gas. When the exhaust gas component sensor 510A detects a threshold composition of the exhaust gas, the control unit 500 determines that the filter assembly 400A contains an estimated load of components of the exhaust gas. When the estimated load of the filter 402A corresponds to its maximum load, the control unit 500 triggers the operation of the actuators 502A, 502B and switches the fluid connections of the filter assemblies 400A, 400B. As a result, the filter assembly 400A is in the purging configuration and the filter assembly 400B is in the loading configuration (FIG. 6). In addition, the exhaust gas component sensor 510A is rendered inactive by the control unit 500 and the exhaust gas component sensor 510B is rendered active by the control unit 500. As the filter assembly 400A is configured in the purging configuration, the filter 402A is purged from some of the components of the exhaust gas contained therein to a sufficient amount. When the estimated load of the filter 402B corresponds to its maximum load, the control unit 500 triggers the operation of the actuators 502A, 502B and switches the fluid connections of the filter assemblies 400A, 400B. The exhaust gas component sensor 510B is rendered inactive by the control unit 500 and the exhaust gas component sensor 510A is rendered active by the control unit 500. As a result, the filter assemblies 400A, 400B are configured back into the initial state shown in FIG. 5 for a new cycle. Cycles are repeated as long as the engine 136 is operated below the threshold effective engine speed.

In implementations including the preprogrammed mapping table, the mapping table is preprogrammed in a memory of the control unit 500. As the control unit 500 is operatively connected to the engine 136, the control unit 500 can take into account different operating conditions of the engine 136, including the effective engine speed. The control unit 500 maps the operating conditions of the engine 136 on the mapping table. The control unit 500 can then determine an estimated load of some of the components of the exhaust gas within one of the filter assemblies 400A, 400B that is in the loading configuration.

Referring to FIG. 5, when the estimated load of the filter 402A corresponds to its maximum load, the control unit 500 triggers the operation of the actuators 502A, 502B and switches the fluid connections of the filter assemblies 400A, 400B. As a result, the filter assembly 400A is in the purging configuration and the filter assembly 400B is in the loading configuration (FIG. 6). When the estimated load of the filter 402B corresponds to its maximum load, the control unit 500 triggers the operation of the actuators 502A, 502B, switches the fluid connections of the filter assemblies 400A, 400B and the filter assemblies 400A, 400B are configured back into the initial state shown in FIG. 5 for a new cycle. Cycles are repeated as long as the engine 136 is operated below the threshold effective engine speed.

In yet another implementation, the exhaust gas component sensors 510A, 510B and the preprogrammed mapping table are used in combination. It is contemplated that using a combination of the exhaust gas component sensors 510A, 510B and the preprogrammed mapping table could make the control unit 500 more accurately determine the estimated load in the filters 402A, 402B. Again, the switching between the loading and purging configurations of each filter assembly 400A, 400B (shown in FIGS. 5 and 6) allows for a continuous filtering of the exhaust gas as long as the engine 136 is operated below the threshold effective engine speed.

Referring to FIGS. 2 and 6, the air intake system 350 includes heating channels 380 defined within the engine 136, as described above. The heating channels 380 are only shown in FIG. 6 for sake of clarity and are connected to the conduit 312A, but further heating channels 380 could also be connected to the conduit 312B. It is contemplated that the heating channels 380 could alternatively be formed across or proximate the outside of the engine 136, such as between the engine 136 and the cowling 138 proximate the stator (not shown), which, as will be appreciated by one skilled in the art, will heat up during use. As such, in use, fresh air flowing past the stator will be heated thereby prior to passing through the filter assembly 400.

In some implementations, the loading of the filters 402A, 402B is quicker than the purging thereof. As such, a residual load of some of the components of the exhaust gas remains in the filters 402A, 402B even after their purging during the cycles described above. It is contemplated that the residual load is purged from the filters 402A, 402B when the engine 136 is operated above the threshold engine speed, as both filter assemblies 400A, 400B are configured in the purging configuration (FIG. 7).

Referring to FIG. 7, when the internal combustion engine 136 is operated above the threshold effective engine speed, the control unit 500 triggers the operation of the actuators 502A, 502B such that the filter assemblies 400A, 400B are both in the purging configuration. As schematically illustrated by an arrow, the water sprayer assembly 330 is in operation, i.e. water is sprayed inside the main exhaust conduit 304, when the filter assemblies 400A, 400B are both in the purging configuration. It is also contemplated that the filter assemblies 400A, 400B could be both configured in the purging configuration when the filters 402A, 402B contain an estimated residual load of some of the components of the exhaust gas. It is contemplated that the estimated residual load could be determined by the control unit 500 using the preprogrammed mapping table.

In yet another implementation (not shown), more than two filter assemblies 400 could be used. For example, three filter assemblies could be used and their fluid connections could be switched between the loading and purging configuration in the following manner. When the first filter assembly is in the loading configuration, the second and third filter assemblies are in the purging configuration. When the first filter assembly reaches its maximum load, the fluid connections are switched such that the first filter assembly is in the purging configuration, the second filter assembly is in the loading configuration and the third filter assembly is in the purging configuration. When the second filter assembly reaches its maximum load, the fluid connections are switched such that the first filter assembly is in the purging configuration, the second filter assembly is in the purging configuration and the third filter assembly is in the loading configuration. When the third filter assembly reaches its maximum load, the fluid connections are switched such that the first filter assembly is in the loading configuration, the second filter assembly is in the purging configuration and the third filter assembly is in the purging configuration for a new cycle. Cycles are repeated as long as the engine 136 is operated below the threshold effective engine speed. The use of three filter assemblies may reduce or eliminate any residual load in the filter assemblies as each filter assembly is in the purging configuration during more time than in the loading configuration. When the engine is operated above the threshold engine speed, the three filter assemblies are in the purging configuration.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A propulsion system comprising:
an internal combustion engine comprising an exhaust manifold and an engine air intake;
a cowling port fluidly connected to the exhaust manifold;
an auxiliary fresh air intake fluidly connected to the engine air intake;
a filter assembly comprising an adsorbent material and being configurable between a loading configuration allowing for a filtration of at least some components of an exhaust gas of the internal combustion engine, and a purging configuration allowing for a removal of the at least some of the components of the exhaust gas from the filter assembly, wherein:
in the loading configuration the filter assembly is fluidly connected between the exhaust manifold and the cowling port;
in the purging configuration the filter assembly is fluidly connected between the auxiliary fresh air intake and the engine air intake; and
above a threshold effective engine speed of the internal combustion engine, the filter assembly is in the purging configuration.

2. The propulsion system of claim 1, wherein the filter assembly further comprises a hollow body, first and second ports and a compartment formed within the hollow body and containing the adsorbent material, the compartment being fluidly connected between the first and second ports.

3. The propulsion system of claim 2, wherein:
when in the purging configuration, the second port is fluidly connected to the auxiliary fresh air intake of the propulsion system, and the first port is fluidly connected to the engine air intake of the propulsion system; and
when in the loading configuration, the first port is fluidly connected to the exhaust manifold of the propulsion system, and the second port is fluidly connected to the cowling port of the propulsion system.

4. The propulsion system of claim 2, wherein the filter assembly comprises first and second filter assemblies configurable such that:
when the internal combustion engine is below the threshold effective engine speed, one of the first and second filter assemblies is in the loading configuration, the other one of the first and second filter assemblies is in the purging configuration; and
when the internal combustion engine is above the threshold effective engine speed, the first and second filter assemblies are both in the purging configuration.

5. The propulsion system of claim 4, further comprising:
a valve assembly fluidly connected to the first port of the first and second filter assemblies;
an auxiliary exhaust conduit extending between the exhaust manifold and the valve assembly; and
a purged air conduit extending between the valve assembly and the engine air intake.

6. The propulsion system of claim 4, wherein at least one of the first and second filter assemblies switches between the loading and purging configurations after a predetermined amount of time.

7. The propulsion system of claim 4, wherein at least one of the first and second filter assemblies switches between the loading and purging configurations when the at least one of the first and second filter assemblies contains an estimated load of the components of the exhaust gas.

8. The propulsion system of claim 7, further comprising:
a control unit; and
at least one of:
an exhaust gas component sensor operatively connected to the control unit and being connected to the propulsion system between the first and second filter assemblies and the cowling port; and
a mapping table preprogrammed in the control unit and taking into account operating conditions of the internal combustion engine;
wherein the estimated load of the components of the exhaust gas within each of the first and second filter assemblies is determined by the control unit.

9. The propulsion system of claim 8, wherein each of the first and second filter assemblies further comprises:
a valve assembly fluidly connected to the first port;
an auxiliary exhaust conduit extending between the exhaust manifold and the valve assembly;
a purged air conduit extending between the valve assembly and the engine air intake; and
the control unit is operatively connected to each valve assembly for switching each of the first and second filter assemblies between the loading and purging configurations.

10. The propulsion system of claim 4, wherein:
the cowling port comprises first and second cowling ports;
the auxiliary fresh air intake comprises first and second auxiliary fresh air intakes;
the first filter assembly is fluidly connected between the exhaust manifold and the first cowling port when in the loading configuration;
the first filter assembly is fluidly connected between the first auxiliary fresh air intake and the engine air intake when in the purging configuration;
the second filter assembly is fluidly connected between the exhaust manifold and the second cowling port when in the loading configuration; and
the second filter assembly is fluidly connected between the second auxiliary fresh air intake and the engine air intake when in the purging configuration.

11. The propulsion system of claim 10, wherein the first auxiliary fresh air intake corresponds to the first cowling port and the second auxiliary fresh air intake corresponds to the second cowling port.

12. The propulsion system of claim 2, wherein the exhaust gas flows through the filter assembly from the first port to the second port in the loading configuration, and fresh air flows through the filter assembly from the second port to the first port in the purging configuration.

13. The propulsion system of claim 1, wherein the adsorbent material is activated carbon.

14. The propulsion system of claim 1, further comprising a valve disposed between the auxiliary fresh air intake and the engine air intake.

15. The propulsion system of claim 1, wherein:
the propulsion system is a marine outboard engine for propelling a watercraft; and the filter assembly is disposed beneath a cowling of the marine outboard engine, and rearward of the internal combustion engine.

16. The propulsion system of claim 1, wherein the auxiliary fresh air intake corresponds to the cowling port.

17. The propulsion system of claim 1, comprising:
a main exhaust conduit fluidly connected between the exhaust manifold and a main exhaust port;
an auxiliary exhaust conduit fluidly connected to the main exhaust conduit and extending between the main exhaust conduit and the filter assembly; and
a purged air conduit extending between the filter assembly and the engine air intake.

18. The propulsion system of claim 17, wherein, when in the loading configuration, the filter assembly is fluidly connected between the main exhaust conduit and the cowling port through the auxiliary exhaust conduit.

19. The propulsion system of claim 1, further comprising heating channels defined within the internal combustion engine and extending between the auxiliary fresh air intake and the filter assembly, such that when the filter assembly is in the purging configuration, fresh air is heated up before passing through the filter assembly and on to the engine air intake.

20. A method for treating exhaust gas of an internal combustion engine in a propulsion system, comprising:

a) passing the exhaust gas through a first filter assembly that is fluidly connected between an exhaust manifold and a cowling port of the propulsion system for loading at least some of the components of the exhaust gas therein while simultaneously passing fresh air through a second filter assembly that is fluidly connected between an auxiliary fresh air intake and an engine air intake of the propulsion system for purging therefrom the at least some of the components of the exhaust gas when the internal combustion engine is operated below a threshold effective engine speed of the internal combustion engine;
b) switching fluid connections of the first and second filter assemblies; and
c) following the switching, passing the exhaust gas through the second filter assembly that is fluidly connected between the exhaust manifold and the cowling port of the propulsion system for loading the at least some of the components of the exhaust gas therein while simultaneously passing fresh air through the first filter assembly that is fluidly connected between the auxiliary fresh air intake and the engine air intake of the propulsion system for purging therefrom the at least some of the components of the exhaust gas.

* * * * *